US009567094B2

(12) United States Patent
Tichborne et al.

(10) Patent No.: US 9,567,094 B2
(45) Date of Patent: Feb. 14, 2017

(54) AIRCRAFT INERTING SYSTEM

(71) Applicants: AIRBUS OPERATIONS LIMITED, Bristol (GB); AIRBUS OPERATIONS GMBH, Hamburg (DE)

(72) Inventors: Franklin Tichborne, Bristol (GB); Brian Hughes, Belfast (GB); Gwènaëlle Marie Lucette Renouard-Vallet, Hamburg (DE); Stephen Edward Burnell, Chippenham (GB)

(73) Assignees: AIRBUS OPERATIONS LIMITED, Bristol (GB); AIRBUS OPERATIONS GMBH, Hamburg (DE)

( * ) Notice: Subject to any disclaimer, the term of this patent is extended or adjusted under 35 U.S.C. 154(b) by 409 days.

(21) Appl. No.: 14/194,545

(22) Filed: Feb. 28, 2014

(65) Prior Publication Data
US 2014/0238501 A1    Aug. 28, 2014

(30) Foreign Application Priority Data

Feb. 28, 2013 (GB) .................................. 1303527.4

(51) Int. Cl.
*B64D 37/32* (2006.01)
*B64D 37/06* (2006.01)
*B64D 41/00* (2006.01)

(52) U.S. Cl.
CPC ............... *B64D 37/32* (2013.01); *B64D 37/06* (2013.01); *B64D 2041/005* (2013.01);
(Continued)

(58) Field of Classification Search
CPC .................................. B64D 37/32; B64D 37/06
(Continued)

(56) References Cited

U.S. PATENT DOCUMENTS 8,825,227 B2 *  9/2014  Saint-Marc ............ B64D 43/00
                                              701/16
9,102,416 B1 *  8/2015  Cutler ..................... B64D 37/32
(Continued)

FOREIGN PATENT DOCUMENTS

CN    101891017 A    11/2010
EP    1253077 A1    10/2002
(Continued)

OTHER PUBLICATIONS

Search Report issued in European Application No. 14156709.9; mail date Feb. 1, 2016.
(Continued)

*Primary Examiner* — Timothy L Maust
*Assistant Examiner* — Timothy P Kelly
(74) *Attorney, Agent, or Firm* — Hauptman Ham, LLP

(57) ABSTRACT

A method of controlling a flow rate of inerting gas introduced into a vented aircraft fuel tank, the method comprising: monitoring changes in a quantity of a fuel in the aircraft fuel tank; monitoring changes in the ambient air pressure external to the aircraft fuel tank; and actively controlling a flow rate of inerting gas, $\dot{m}(I)$, introduced into the aircraft fuel tank based upon changes in the quantity of fuel in the fuel tank and changes in the ambient air pressure, p. Also, an aircraft including a vented fuel tank, a supply of inerting gas for rendering inert the fuel tank ullage, and a controller for performing the method.

19 Claims, 2 Drawing Sheets

(52) U.S. Cl.
CPC ............... *Y02T 50/44* (2013.01); *Y02T 90/36* (2013.01); *Y10T 137/0379* (2015.04); *Y10T 137/3099* (2015.04)

(58) Field of Classification Search
USPC ....... 141/4, 63–64; 244/135 R, 135 A, 129.2
See application file for complete search history.

(56) References Cited

U.S. PATENT DOCUMENTS

| | | |
|---|---|---|
| 2004/0035461 A1 | 2/2004 | Susko |
| 2006/0021652 A1 | 2/2006 | Surawski |
| 2007/0054610 A1 | 3/2007 | Jensen |
| 2008/0017248 A1 | 1/2008 | Massey et al. |
| 2012/0193479 A1 | 8/2012 | Roscoe et al. |

FOREIGN PATENT DOCUMENTS

| | | |
|---|---|---|
| GB | 2411352 A | 8/2005 |
| WO | 2006122282 A2 | 11/2006 |

OTHER PUBLICATIONS

UKIPO Search Report for Application No. GB1303527.4, dated Jul. 9, 2013.

\* cited by examiner

AIRCRAFT INERTING SYSTEM

RELATED APPLICATIONS

The present application is a based on and claims priority to United Kingdom Application Number GB1303527.4, filed Feb. 28, 2013, the disclosure of which is hereby incorporated by reference herein in its entirety.

FIELD OF THE INVENTION

The present invention relates to methods and apparatus for introducing inert gas into a vented aircraft fuel tank.

BACKGROUND OF THE INVENTION

Following in-service incidents of aircraft fuel tank explosions, new regulations to achieve flammability reduction in fuel tanks have been introduced for new commercial aircraft.

The relevant FAA Regulation states: "A fuel tank is considered inert when the bulk average oxygen concentration within each compartment of the tank is 12 percent or less from sea level up to 10,000 feet altitude, then linearly increasing from 12 percent at 10,000 feet to 14.5 percent at 40,000 feet altitude, and extrapolated linearly above that altitude."

Typically this is achieved by continuously adding Nitrogen to the fuel tank ullage during operation and keeping the Ullage Gas Oxygen Fraction (UGOF) below 11%. Currently, one solution is to use Air Separation Modules (ASMs) to molecularly separate the Nitrogen from the Oxygen in air, either obtained as engine bleed air or compressed external air.

On future aircraft it is proposed to use fuel cell technology to provide the auxiliary power for such functions as ground operations, ground propulsion and emergency in-flight power. As a by-product of this technology where Hydrogen is catalytically reacted with Oxygen (supplied from the ambient air) to produce electric power, Oxygen Depleted Air (ODA) is produced where the Oxygen concentration is typically <10.5%. This air is also very humid (approximately 100%) and hot, so it needs to be processed to reduce both its humidity and temperature before it can be used to inert the fuel tanks.

Reducing the temperature and humidity is a known technology however it consumes aircraft resources, in particular creating a high demand when other systems are also at a high demand, typically on aircraft descent into hot destinations.

SUMMARY OF THE INVENTION

A first aspect of the invention provides a method of controlling a flow rate of inerting gas introduced into a vented aircraft fuel tank, the method comprising: monitoring changes in a quantity of a fuel in the aircraft fuel tank; monitoring changes in the ambient air pressure external to the aircraft fuel tank; and actively controlling a flow rate of inerting gas, $\dot{m}(I)$, introduced into the aircraft fuel tank based upon changes in the quantity of fuel in the fuel tank and changes in the ambient air pressure, P.

The invention is advantageous in that by actively controlling the flow rate of inert gas being introduced into the fuel tank, use of energy resources on-board the aircraft can be optimised. As the fuel in the fuel tank is consumed (by the aircraft engines) the fuel tank ullage volume will increase. As the ambient air pressure increases (e.g. during descent from a higher altitude) there would ordinarily be a net inflow of ambient air into the vented fuel tank. By substantially matching the ambient air ingestion—due to pressure changes—and ullage volume expansion—due to fuel burn—with the amount of inert gas supplied to the fuel tank, an optimised inerting solution can be realised. Compared with an inerting solution where an excess of inert gas is introduced into the fuel tank to maintain the UGOF below stated limits based upon worst case scenario estimations, the volume of inert gas required will be reduced.

With any inerting system, whether this be an ASM or a hydrogen fuel cell producing ODA as a bi-product of electrical power generation, optimising the supply of inert gas to the fuel tank will minimise the drain on energy resources. In the case of an ASM using engine bleed air, optimising the inert gas flow will reduce the amount of bleed air required giving fuel burn savings. In the case of a hydrogen fuel cell, optimising the production and processing of ODA will reduce hydrogen consumption, which will reduce the overall weight of the fuel cell system (as the hydrogen is bottled).

In addition, by reducing the volume of inert gas that may otherwise be unnecessarily fed into the fuel tank, which will inevitably be pushed out of the fuel tank vent system, there will be a reduction in emissions. By reducing the amount of fuel vapour and/or carbon-dioxide rich ODA that is pushed out into the atmosphere, the invention may also provide environmental benefits, particularly at high altitude during cruise where contrails may develop.

The mass flow rate of the inerting gas may be controlled such that the mass flow rate of the fuel tank ullage that is vented from the fuel tank is minimized.

The mass flow rate of the inerting gas may be controlled such that the mass flow rate of the fuel tank ullage that is vented from the fuel tank is substantially zero during ground manoeuvring, cruise and descent operations.

The mass flow rate of the inerting gas may be controlled such that the mass flow rate of the fuel tank ullage that is vented from the fuel tank is positive (i.e. a net outflow) but near zero throughout all operational ground and flight phases of the aircraft except climb. During climb there will be a net outflow of ullage gas to the ambient atmosphere due to a large reduction in ambient air pressure. The ullage gas will already be inert at this time.

The step of monitoring changes in the quantity of fuel in the fuel tank may include reading a mass flow rate of fuel being consumed, e.g. by engine(s).

The fuel mass flow rate may be read from a full authority digital engine controller (FADEC) of the engine(s).

The step of monitoring the ambient air pressure external to the aircraft fuel tank may include reading the ambient air pressure from an air data system (ADS).

The method may further comprise calculating a net volume flow rate, $Q(U_P)$, of ambient air into the fuel tank ullage via its vent system due to the rate of change in ambient air pressure, $\delta P/\delta t$, and the instantaneous fuel tank ullage volume, $V(U)$, where $Q(U_P) = \delta P/\delta t \times V(U)$.

The method may further comprise calculating a net volume flow rate, $Q(U_F)$, of ambient air into the fuel tank ullage via its vent system due to changes in the instantaneous fuel tank ullage volume, $V(U)$, as fuel is consumed (e.g. by the engines, auxiliary power unit).

The instantaneous ullage volume, $V(U)$, may be determined based upon the fuel tank geometry and the volume of fuel $V(F)$ in the fuel tank.

The rate of increasing ullage volume, $\delta V(U)/\delta t$, may be calculated based upon a mass flow rate of fuel, $\dot{m}(F)$, being removed from the fuel tank.

The method may further comprise calculating a total volume flow rate, Q(U), of increasing ullage volume, V(U), where:

$$Q(U)=Q(U_P)+Q(U_F).$$

The method may further comprise calculating a mass flow rate, ṁ(U), of increasing fuel tank ullage based upon the total volume flow rate Q(U) and the instantaneous ambient air pressure, P, where:

$$\dot{m}(U)=Q(U)\times P\times \rho_A$$

where $\rho_A$ is the density of ODA at the ullage temperature, T, and at 1 bar.

The density $\rho_A$ is obtained from a formula that includes the fraction of Nitrogen and Oxygen in the ODA, as well as the fuel vapour and their individual molecular weights and ullage temperature, T. When fully inerted the Oxygen fraction is typically around 10.5% when using fuel cell exhaust. The ullage temperature, T, may be provided by the FQMS.

The mass flow rate of inerting gas, ṁ(I), introduced into the aircraft fuel tank may be actively controlled to be approximately equal to a mass flow rate, ṁ(U), of increasing fuel tank ullage.

The mass flow rate of inerting gas, ṁ(I), introduced into the aircraft fuel tank may be actively controlled to be greater than a mass flow rate, ṁ(U), of increasing fuel tank ullage by a value, x, where x is less than 2 g/s, preferably less than 1 g/s, and more preferably less than 0.5 g/s. The mass flow rate of inerting gas, ṁ(I), more accurately is the minimum at which the turbulent pressure changes over the vent during flight are overcome and a minimal net outflow of gas from the vent is guaranteed. In practice this is assisted by the flame arrestor labyrinth in the vent which tends to promote linear rather than turbulent vent flow.

The mass flow rate of inerting gas, ṁ(I), introduced into the aircraft fuel tank may be controlled by adjusting a valve. The mass flow rate of inerting gas, ṁ(I), introduced into the aircraft fuel tank may be controlled, in addition or alternatively, by adjusting a rate of generation of the inerting gas.

A further aspect of the invention provides an aircraft including a vented fuel tank, a supply of inerting gas for rendering inert the fuel tank ullage, and a controller for performing the method according to the first aspect of the invention.

The aircraft may further comprise one or more main engines each having a full authority digital engine controller (FADEC) coupled to the inerting gas controller. The FADEC may provide the fuel mass usage rate, δm(F)/δt, which is converted to the fuel volume usage rate, δV(F)/δt, where $$\delta V(F)/\delta t=\delta m(F)/\delta t/\rho_F,$$

$\rho_F$ is the fuel density obtained from the FQMS.

The ullage volume increase rate due to fuel usage, $\delta V(U_F)/\delta t$, is equal to the fuel volume usage rate, δV(F)/δt.

The aircraft may further comprise an air data system (ADS) coupled to the inerting gas controller. The ADS may provide the ambient air pressure, P, and the rate of change of ambient air pressure δP/δt.

The aircraft may further comprise an on-board inert gas generator for generating the supply of inerting gas and coupled to the inerting gas controller.

The on-board inert gas generator may be a fuel cell, which produces oxygen depleted air (ODA) as a bi-product of electrical power generation. Alternatively, the on-board inert gas generator may include an air separation module (ASM).

The aircraft may further comprise a valve coupled between the supply of inerting gas and the fuel tank, the valve being coupled to the inerting gas controller and adapted to control a flow of inerting gas to the fuel tank.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
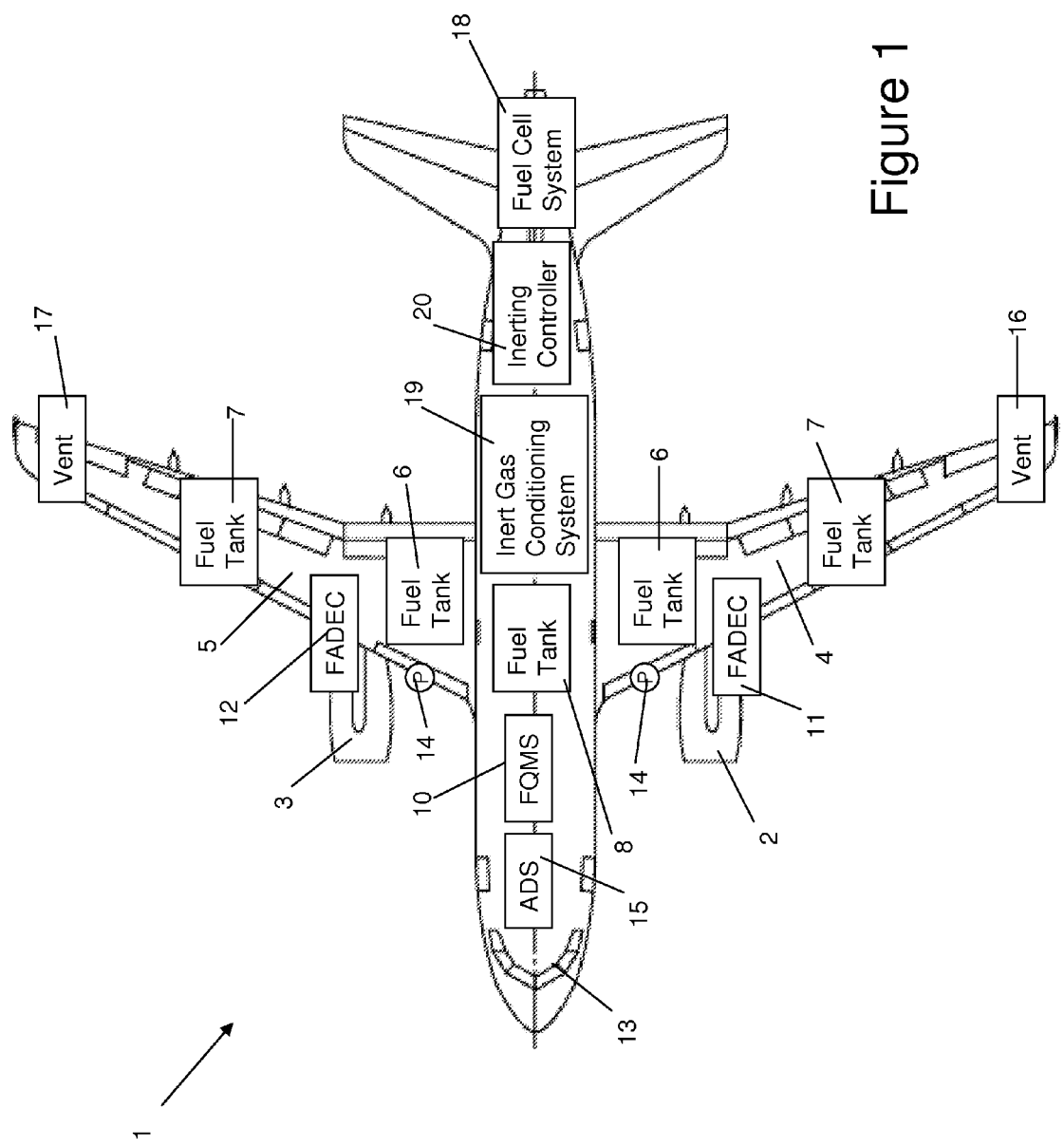
FIG. 1 illustrates a plan view of an aircraft including the inerting controller of the invention.

FIG. 1 illustrates a plan view of an aircraft 1, such as a commercial jet passenger transport aircraft. Various aircraft systems have been schematically superimposed in block form over the plan view of the aircraft for illustration purposes, and their true location should not be inferred from this drawing. The aircraft 1 includes many conventional aircraft systems currently found on existing in-service aircraft, some already proposed systems that will appear on future aircraft, and the controller of this invention which will interface with these systems.

The aircraft 1 includes main engines 2, 3, which in this example are twin under-wing mounted jet engines. The wings 4, 5 include integral fuel tanks 6, 7 and there is a further centre fuel tank 8 in the centre wing box, in a conventional manner. A fuel quantity monitoring system (FQMS) 10 interfaces with a plurality of sensors for sensing various fuel parameters of fuel within the fuel tanks 6-8. These may include fuel level sensors, fuel and ullage temperature sensors, etc. of conventional type. The FQMS 10 determines the quantity of fuel in the fuel tanks based on the sensed fuel parameters and known fuel tank dimensions.

Each engine 2, 3 has an associated full-authority digital engine controller (FADEC) 11, 12 for controlling the engine. The FADECs 11, 12 are coupled via the aircraft data network (not shown in FIG. 1) to the aircraft cockpit 13 and provide fuel consumption rates to the inerting controller.

A plurality of air pressure sensors, e.g. pitot-static probes, 14 are coupled to an air data system (ADS) 15. The ADS is coupled via the aircraft data network to the aircraft cockpit 13. The ADS is operable to determine the aircraft's airspeed, Mach number, altitude, and climb/descent rate from the air pressure sensors and other data received from gyroscopes, global position system (GPS), accelerometers and air temperature sensors, for example. The ADS may be combined with navigation systems in an Air Data Inertial Reference System (ADIRS), or similar.

Details of the FQMS 10, FADECs 11, 12 and ADS 15 will not be described in further detail here as these systems, or similar, are well known in the art.

The integral fuel tanks 6-8 include a vent system of conventional type for equalising air pressures, or at least reducing air pressure differential, between the fuel tank ullage (the volume of gas in the fuel tanks above the liquid fuel) and the ambient atmosphere external to the aircraft. The aircraft 1 includes vents 16, 17, such as a NACA duct of conventional type, mounted at the tip of each wing 4, 5 and connected via venting pipework and flame arrestors (not shown) to the ullage of each fuel tank 6-8. The fuel tanks 6-8 may further comprise over pressure relief valves etc. of conventional type to prevent an over-pressure developing within the fuel tanks. The vents 16, 17 are open to the ambient atmosphere and allow ullage gas to be expelled to ambient, and allow ambient air ingress to the fuel tanks. A valve or bypass may be used to restrict/enable the gas flow through the vents, if desired.

The aircraft 1 includes a fuel cell power system 18, which in this example is a multi-functional fuel cell system (MFFCS). The fuel cell system 18 is operable to provide auxiliary power for such functions as ground operations, ground propulsion and emergency in-flight power, and as such replaces the conventional auxiliary power unit (APU) based upon existing jet turbine technology and the Emergency Ram Air Turbine (RAT). The fuel cell system 18 catalytically reacts Hydrogen (stored in cryogenic tank form in the aft aircraft fuselage) with Oxygen (obtained from the ambient air external to the aircraft) to produce electrical power. Details of the fuel cell system 18 will not be repeated here as they will be known to those persons skilled in the art.

As a by-product of this electrical power generation, the fuel cell system 18 produces Oxygen Depleted Air (ODA) where the Oxygen concentration is typically less than 10.5%. This air is very humid (approximately 100%) and hot, so needs to be processed to reduce both its humidity and temperature before it can be used to inert the fuel tanks 6-8. The aircraft 1 includes an inert gas conditioning system 19, based on existing technology, which reduces the temperature and humidity of the ODA before it is introduced into the fuel tanks 6-8.

Figure 2:
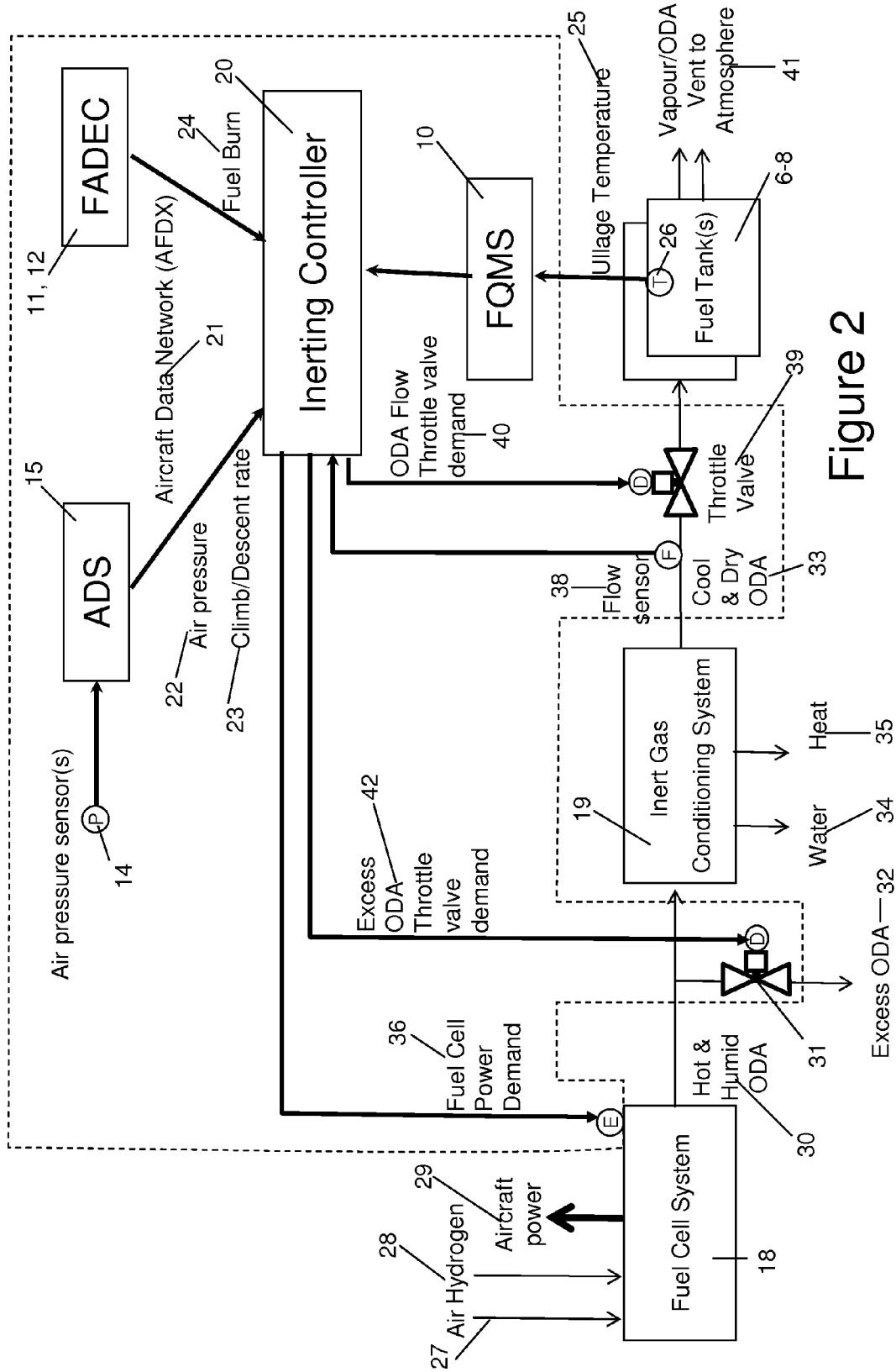
FIG. 2 illustrates a schematic diagram of the inerting controller connections to various aircraft systems.

The invention provides an inerting controller 20, which will now be described in detail with reference to FIG. 2. In FIG. 2, the region bounded by the broken line delimits those parts of the aircraft systems which have been added or modified so as to enable an exemplary embodiment of the invention.

The inerting controller 20 is coupled to the ADS 15 and the FADECs 11, 12 by the aircraft data network 21, e.g. AFDX. The ADS provides air pressure data 22 and climb/descent rate data 23 to the inerting controller 20. The FADECs 11, 12 provide fuel burn (rate) data 24 to the inerting controller 20. The inerting controller is also coupled to the FQMS 10, which provides ullage temperature 25 and fuel quantity data (including fuel mass and density) to the inerting controller 20. The ullage temperature data is obtained from temperature sensor(s) 26 disposed in the fuel tanks 6-8.

The fuel cell system 18 is supplied with air 27 (containing Oxygen) and Hydrogen 28, and outputs aircraft (electrical) power 29 to the aircraft power network (not shown) and hot and humid ODA 30 to the inert gas conditioning system 19. A valve 31 between the fuel cell system 18 and the inert gas conditioning system 19 diverts excess ODA 32 produced by the fuel cell system 18 that is not required by the inert gas conditioning system 19. The excess hot and humid ODA 32 may be expelled from the aircraft 1, or used as a heat source by other aircraft systems.

The inerting controller 20 is coupled to the fuel cell system 18 and outputs a fuel cell power demand signal 36 to the fuel cell system 18. The inerting controller is coupled to the valve 31 and outputs an excess ODA throttle valve demand signal 37 to the valve 31.

The inert gas conditioning system 19 processes the hot and humid ODA 30 and outputs cool and dry ODA 33 towards the fuel tanks 6-8. Excess water 34 and heat 35 extracted from the hot and humid ODA 30 by the inert gas conditioning system 19 may be expelled from the aircraft 1, or used as a water or heat source by other aircraft systems.

The inerting controller 20 is coupled to a flow sensor 38 which detects the mass flow rate of cool and dry ODA 33 produced by the inert gas conditioning system 19. A throttle valve 39 is disposed between the inert gas conditioning system 19 and the fuel tanks 6-8 for controlling the flow of cool and dry ODA 33 being fed to the fuel tanks 6-8. The inerting controller 20 is coupled to the throttle valve 39 and outputs an ODA flow throttle valve demand signal 40 to the throttle valve 39.

Since the fuel tanks 6-8 are vented (by vents 16, 17) to the ambient atmosphere, fuel vapours, ODA, or other constituents of the ullage gas, are vented 41 to the ambient atmosphere depending on the changing air pressure external to the aircraft 1 (e.g. as the aircraft climbs/descends) and depending on the flow rate of ODA 33 being fed to the fuel tanks 6-8. The inerting controller 20 includes an algorithm which aims to minimise the outflow of ullage gas to the ambient atmosphere via the vents 16, 17 during all ground and flight conditions of the aircraft, except climb.

During climb there will generally be a net outflow of ullage gas to ambient due to the rapidly decreasing ambient air pressure as the aircraft altitude increases. The effects of this pressure change will invariably exceed the increasing ullage volume due to fuel burn by the engines, hence the net outflow of ullage gas will be generally unavoidable. The supply of ODA to the fuel tanks is turned off during climb to minimise the outflow due to inerting.

Operation of the algorithm of the inerting controller 20 to achieve the aim of minimising the outflow of ullage gas to the ambient atmosphere during all ground and flight conditions of the aircraft, except climb, will now be described in detail.

The algorithm reads the ambient air pressure data 22 from the ADS 15. Differentiating the air pressure data 22 reveals the rate of change of ambient air pressure. The inerting controller 20 reads the fuel quantity parameters from the FQMS 10 and based upon the known geometry of the fuel tanks 6-8 calculates the fuel tank ullage volume. The ullage volume is the fuel tank volume minus the fuel volume in the fuel tanks.

The algorithm calculates a theoretical net ullage volume flow rate $Q(U_P)$ of ambient air into the fuel tanks 6-8 via the vents 16, 17 due to the changes in ambient air pressure. The theoretical net volume flow rate of ambient air into the fuel tanks is calculated based upon the rate of change of the ambient air pressure and the fuel tank ullage volume. The value is theoretical because, as will be apparent from the following, the inerting controller 20 aims to ensure that the ODA supplied to the fuel tanks provides a minimal exhaust of ullage gas from the vents 16, 17 (i.e. no net inflow of ambient air) during all ground and flight conditions, except climb.

The algorithm reads the mass flow rate of fuel consumed by the engines 2, 3 (fuel burn rate) from the FADECs 11, 12. The algorithm calculates the ullage volume increase due to the fuel burn and from this calculates a volume flow rate $Q(U_F)$ of the increasing ullage volume due to fuel burn.

Summing the ullage volume flow rates due to changing ambient pressure and fuel burn gives a total ullage volume increase flow rate, $Q(U)=Q(U_P)+Q(U_F)$. From this, the mass flow rate of increasing fuel tank ullage, $\dot{m}(U)$, can be calculated based upon the ullage temperature 25 and ullage gas composition.

The flow sensor 38 measures the flow rate of cool and dry ODA 33, which is fed back to the inerting controller 20. The algorithm uses the sensed ODA flow signal from flow sensor 38 as feedback control. If the sensed ODA flow is too low then the inerting controller 20 issues an ODA flow throttle valve "open further" demand 40 to the throttle valve 39. If the sensed ODA flow is still too low then the inerting controller 20 issues a fuel cell power demand signal 36 to the fuel cell system 18 to increase output. The excess power is fed to the main aircraft power network, enabling the engine generators to produce less power.

If the sensed ODA flow is too high then the inerting controller 20 issues a fuel cell power demand signal 36 to the fuel cell system 18 to decrease output. However, since the fuel cell system is a multi-functional fuel cell system, whose functions include providing aircraft auxiliary electrical power, then the output of the fuel cell system 18 may not be decreased if the fuel cell is required for aircraft power 29. The inerting controller 20 will issue an excess ODA throttle valve demand 42 to the valve 31 to open such that the hot and humid ODA 30 entering the inert gas conditioning system 19 is reduced and excess ODA 32 is expelled. Due to a lag in the change of ODA flow sensed by flow sensor 38 the inerting controller 20 issues an ODA flow throttle valve demand 40 to throttle valve 39 to decrease the flow of ODA 33 to the fuel tanks 6-8.

The throttle valve 39 is controlled such that the mass flow rate of ODA (inert gas), $\dot{m}(I)$, being fed to the fuel tanks 6-8 is equivalent to $\dot{m}(U)+x$, where x is a small margin to ensure continuous positive ODA flow. The mass flow rate increment x is preferably substantially zero, and will depend on the fuel tank inerting system configuration, but will typically be less than around 2 g/s.

As mentioned above, the algorithm is "inoperable" and will demand zero ODA flow during climb where there will generally be a significant net outflow of ullage gas due to a decrease in the ambient air pressure. The algorithm also will be inoperable during initial inerting of the fuel tank, where ODA 33 will be supplied at full rate to the fuel tanks 6-8 until the UGOF is below the prescribed limits, regardless of the net outflow of ullage gas from the vents 16, 17. The algorithm will take into account variations in temperature of the ambient air, the fuel tanks and the ODA 33, which will affect gas densities.

The inerting controller 20 is therefore operable to optimise the generation of ODA by the fuel cell system 18, and to optimise the processing of the ODA by the inert gas conditioning system 19, such that the flow rate of ODA to the fuel tanks is actively controlled to ensure that the ullage gas is inert but without exhausting an excess of ullage gas to the ambient atmosphere. This reduces the Hydrogen demands of the fuel cell system 18 (directly, and indirectly as electrical power) and reduces the emissions of ODA and fuel vapours from the fuel tanks.

It will be appreciated that the inerting controller has application to other on-board inert gas generators other than the fuel cell described above, such as ASMs, which would provide a reduction in fuel burn and fuel tank vent emissions. The inerting gas generated by these on-board inert gas generators may be ODA, or Nitrogen Enriched Air (NEA) or Nitrogen, for example.

The inerting controller may be fitted, or retro-fitted, to an existing aircraft fuel system so as to interface with existing ADS, FQMS, FADEC, and on-board inert gas generator (OBIGGS) systems.

Although the invention has been described above with reference to one or more preferred embodiments, it will be appreciated that various changes or modifications may be made without departing from the scope of the invention as defined in the appended claims.

The invention claimed is:

1. A method of controlling a flow rate of inerting gas introduced into an ullage, U, of a vented aircraft fuel tank, the method comprising:

monitoring changes in a quantity of a fuel in the aircraft fuel tank;

monitoring changes in an ambient air pressure external to the aircraft fuel tank;

calculating a net volume flow rate, $Q(U_P)$, of ambient air into the fuel tank ullage, U, via its vent system due to changes in ambient air pressure, P; and actively controlling the flow rate of inerting gas introduced into the aircraft fuel tank based upon changes in the quantity of fuel in the fuel tank and the net volume flow rate, $Q(U_P)$ of ambient air into the fuel tank ullage, U, via its vent system due to changes in ambient air pressure, P.

2. A method according to claim 1, wherein the flow rate of inerting gas is a mass flow rate of inerting gas, and wherein the mass flow rate of the inerting gas is controlled such that a mass flow rate of the fuel tank ullage that is vented from the fuel tank is minimized.

3. A method according to claim 2, wherein the mass flow rate of the inerting gas is controlled such that the mass flow rate of the fuel tank ullage that is vented from the fuel tank is substantially zero during ground manoeuvring, cruise and descent operations.

4. A method according to claim 2, wherein the mass flow rate of the inerting gas is controlled such that the mass flow rate of the fuel tank ullage that is vented from the fuel tank is less than 2 g/s throughout all operational ground and flight phases of the aircraft except climb.

5. A method according to claim 1, wherein the step of monitoring changes in the quantity of fuel in the fuel tank includes reading a mass flow rate of fuel being consumed.

6. A method according to claim 1, wherein the net volume flow rate of ambient air into the fuel tank ullage is calculated based upon a rate of change of the ambient air pressure, $\delta P/\delta t$, and an instantaneous fuel tank ullage volume, $V(U)$.

7. A method according to claim 1, further comprising calculating a net volume flow rate, $Q(U_F)$, of ambient air into the fuel tank ullage, U, via its vent system due to changes in the ullage volume, $V(U)$, as fuel, F, is removed from the fuel tank, and calculating a total volume flow rate, $Q(U)$, of increasing ullage volume, U, where:

$$Q(U)=Q(U_P)+Q(U_F).$$

8. A method according to claim 7, further comprising calculating a mass flow rate, $\dot{m}(U)$, of increasing fuel tank ullage based upon the volume flow rate $Q(U)$ and an instantaneous ambient air pressure, P.

9. A method according to claim 1, wherein the flow rate of inerting gas is a mass flow rate of inerting gas, and wherein the mass flow rate of inerting gas, $\dot{m}(I)$, introduced into the aircraft fuel tank is actively controlled to be approximately equal to a mass flow rate, $\dot{m}(U)$, of increasing fuel tank ullage.

10. A method according to claim 1, wherein the flow rate of inerting gas is a mass flow rate of inerting gas, and wherein the mass flow rate of inerting gas, $\dot{m}(I)$, introduced into the aircraft fuel tank is controlled by adjusting a valve.

11. A method according to claim 1, wherein the flow rate of inerting gas is a mass flow rate of inerting gas, and wherein the mass flow rate of inerting gas, $\dot{m}(I)$, introduced into the aircraft fuel tank is controlled by adjusting a rate of generation of the inerting gas.

12. A method of controlling a flow rate of inerting gas introduced into an ullage, U, of a vented aircraft fuel tank, the method comprising:

monitoring changes in a quantity of a fuel in the aircraft fuel tank;

monitoring changes in an ambient air pressure external to the aircraft fuel tank;

calculating a net volume flow rate, $Q(U_F)$, of ambient air into the fuel tank ullage, U, via its vent system due to changes in the ullage volume, V(U), as fuel, F, is removed from the fuel tank; and, actively controlling the flow rate of inerting gas introduced into the aircraft fuel tank based upon changes in the ambient air pressure, P, and the net volume flow rate, $Q(U_F)$, of ambient air into the fuel tank ullage, U, via its vent system due to changes in the ullage volume, V(U), as fuel, F, is removed from the fuel tank.

13. A method according to claim 12, wherein an increasing ullage volume rate, $\delta V(U)/\delta t$, is calculated based upon a mass flow rate of fuel, $\dot{m}(F)$, being removed from the fuel tank.

14. A method of controlling a flow rate of inerting gas introduced into an ullage, U, of a vented aircraft fuel tank, the method comprising:

monitoring changes in a quantity of a fuel in the aircraft fuel tank;

monitoring changes in the ambient air pressure external to the aircraft fuel tank; and actively controlling a mass flow rate of inerting gas introduced into the aircraft fuel tank based upon changes in the quantity of fuel in the fuel tank and changes in ambient air pressure, P, wherein the mass flow rate of inerting gas, $\dot{m}(I)$, introduced into the aircraft fuel tank is actively controlled to be greater than a mass flow rate, $\dot{m}(U)$, of increasing fuel tank ullage by a value, x, where x is less than 2 g/s.

15. An aircraft including a vented fuel tank, a supply of inerting gas for rendering inert the fuel tank ullage, and a controller for performing the method according to claim 1.

16. An aircraft according to claim 15, further comprising one or more main engines each having a full authority digital engine controller (FADEC) coupled to the controller for performing the method according to claim 1.

17. An aircraft according to claim 15, further comprising an air data system coupled to the controller for performing the method according to claim 1.

18. An aircraft according to claim 15, further comprising an on-board inert gas generator for generating the supply of inerting gas and coupled to the controller for performing the method according to claim 1.

19. An aircraft according to claim 15, further comprising a valve coupled between the supply of inerting gas and the fuel tank, the valve being coupled to the controller for performing the method according to claim 1 and adapted to control a flow of inerting gas to the fuel tank.

* * * * *